(12) United States Patent
Carson

(10) Patent No.: US 6,830,214 B2
(45) Date of Patent: Dec. 14, 2004

(54) ROTARY-WING AIRCRAFT

(76) Inventor: Franklin D. Carson, 933 Street Rd., New Hope, PA (US) 18938

( * ) Notice: Subject to any disclaimer, the term of this patent is extended or adjusted under 35 U.S.C. 154(b) by 0 days.

(21) Appl. No.: 10/194,672

(22) Filed: Jul. 12, 2002

(65) Prior Publication Data
US 2004/0007645 A1 Jan. 15, 2004

(51) Int. Cl.$^7$ .............................................. B64C 27/52
(52) U.S. Cl. ................................................... 244/17.11
(58) Field of Search .......................... 244/17.11, 17.27, 244/211, 212, 213, 221, 123

(56) References Cited

U.S. PATENT DOCUMENTS

| | | | |
|---|---|---|---|
| 1,335,527 A | * | 3/1920 | Plym |
| 2,755,038 A | * | 7/1956 | Gluhareff |
| D188,443 S | * | 7/1960 | Sikorsky |
| 2,980,364 A | * | 4/1961 | Hohenemser |
| 2,997,262 A | * | 8/1961 | Kirk et al. |
| 3,733,039 A | * | 5/1973 | O'Connor et al. |
| 3,927,306 A | * | 12/1975 | Miller |
| 4,043,523 A | * | 8/1977 | Bartoe |
| 4,168,045 A | * | 9/1979 | Wright et al. |
| 4,500,967 A | * | 2/1985 | Murphy et al. |
| 4,603,388 A | * | 7/1986 | Griffith et al. |
| 4,829,441 A | * | 5/1989 | Mandle et al. |
| 5,614,897 A | * | 3/1997 | Durnford |
| 6,032,899 A | * | 3/2000 | Mondet et al. |
| 6,047,924 A | * | 4/2000 | Thomassin et al. |
| 6,195,599 B1 | * | 2/2001 | Laffisse |
| 6,295,006 B1 | * | 9/2001 | Kohlhepp |

* cited by examiner

Primary Examiner—Tien Dinh
(74) Attorney, Agent, or Firm—Woodcock Washburn LLP

(57) ABSTRACT

A preferred embodiment of a rotary-wing aircraft includes a fuselage, a tail boom fixedly coupled the fuselage, a pylon fixedly coupled to the tail boom, and a main rotor assembly rotatably coupled to the fuselage and comprising a hub and a plurality of rotor blades pivotally coupled to the hub. The preferred embodiment also includes a cyclic control adapted to vary an orientation of the rotor blades in relation to the hub on a cyclical basis, and a horizontal stabilizer mounted on one of the pylon and the tail boom. At least a portion of the horizontal stabilizer is movable in relation to the one of the pylon and the tail boom and a position of the at least a portion of the horizontal stabilizer is controllable independent of the cyclic control.

5 Claims, 3 Drawing Sheets

ROTARY-WING AIRCRAFT

FIELD OF THE INVENTION

The present invention relates to rotary-wing aircraft such as helicopters. More particularly, the invention relates to a method and a system for trimming a rotary-wing aircraft about its pitch axis, i.e., for causing the rotary-wing aircraft to maintain a particular orientation about its pitch axis.

BACKGROUND OF THE INVENTION

Rotary-wing aircraft such as helicopters typically comprise a fuselage, a tail boom fixedly coupled to and extending from the fuselage, a pylon fixedly coupled to an end of the tail boom, an engine and transmission mounted on the fuselage, and a rotor coupled to the engine and transmission by a rotatable mast, or drive shaft. The rotor comprises a centrally-located hub, and a plurality of rotor blades coupled to the hub and extending radially outward from the hub. The rotor blades generate lift that suspends the fuselage below the rotor during flight. The overall lift is typically controlled by a collective control that collectively varies the pitch of the rotor blades. Directional control of the helicopter is usually achieved, in part, by a cyclic control that varies the pitch of each rotor blade on a cyclic basis so as to asymmetrically vary the overall lift.

The hub of a helicopter must be tilted forward for the helicopter to fly in the forward direction. Helicopters are often constructed so that the rotor is tilted in relation to the fuselage by several degrees, i.e., the plane of rotation of the hub and the rotor blades is angled in relation to the longitudinal axis of the fuselage. This feature, under certain conditions, allows the fuselage to remain level, or nearly level, as the helicopter is flying forward. (The aerodynamic drag exerted on the fuselage is believed to be at or near its minimum when the fuselage is level in relation to the direction of flight.)

The rotor is tilted in relation to the direction of flight through the use of the cyclic control. Helicopters are typically designed so that minimal cyclic control is needed when the helicopter is operating under normal cruise conditions, and with its center of gravity well within limits. The amount of cyclic control needed to tilt the rotor generally increases, however, as the helicopter is operated at off-cruise conditions, or with a center of gravity approaching its forward or aft limits. Increasing the amount of cyclic control increases the amount of engine power, and thus the amount of fuel, needed to maintain a given flight condition. Hence, operating a helicopter with its center of gravity at or near limits typically increases the fuel consumption (or lowers the airspeed) of the helicopter. (This type of operating condition can routinely occur due to passenger or cargo loading, or as fuel is burned during flight.)

Moreover, operating a helicopter with its center of gravity at or near limits may necessitate tilting the rotor to an extreme that causes the fuselage to tilt substantially in relation to the direction of flight. Tilting the fuselage in this manner substantially increases the drag thereon, resulting in increased fuel consumption or reduced airspeed.

Many helicopters are equipped with a horizontal stabilizer coupled to the pylon or the tail boom. The horizontal stabilizer typically is a wing-like structure, and increases the longitudinal stability of the helicopter, i.e., the stability of the helicopter about its pitch axis, during forward flight. A horizontal stabilizer can be fixed in relation to the pylon or the tail boom, or movable. The position of a movable horizontal stabilizer is typically controlled in conjunction with the helicopter's cyclic control and airspeed to augment the pitch force produced by the cyclic control.

Conventional horizontal stabilizers, in general, are not adapted to compensate for changes in the center of gravity of the helicopter, or the effect of such changes on the trim of the helicopter about its pitch axis. Compensation for changes in the center of gravity is usually achieved exclusively through the use of cyclic control. In other words, cyclic control alone is usually employed to trim the helicopter about its pitch axis in response to changes in the center of gravity (such changes commonly occur due to, for example, shifting passenger loads and fuel burn during flight).

The amount of cyclic control needed to trim a helicopter about its pitch axis can be substantial when the helicopter's center of gravity at or near limits. In other words, compensating for a forward or aft center-of-gravity condition using the cyclic control can necessitate substantial deflection of the cyclic control from its neutral position. Operating a cyclic control in this manner is believe to increase the amount of power needed to maintain a given operating condition, and can thus lead to increased fuel consumption or lower airspeed.

Furthermore, changes in the center of gravity of a helicopter can alter the orientation of the helicopter's fuselage in relation to the direction of flight. Conventional horizontal stabilizers, in general, are not adapted to compensate for such changes. Moreover, the cyclic control is used primarily to control the orientation of the rotor in relation to the direction of flight to attain a desired airspeed. Thus, the cyclic control is largely ineffective at controlling the orientation of the fuselage. Tilting of the fuselage in relation to the direction of flight is believed to increase the aerodynamic drag on the helicopter, and is therefore considered highly undesirable. Tilting of the fuselage and, hence, aerodynamic drag, can be substantial when the helicopter is operating with a center of gravity at or near limits.

Consequently, a need exists for a method and a system that allow a pilot to compensate for changes in the center of gravity of a helicopter without relying exclusively on the use of cyclic control.

SUMMARY OF THE INVENTION

A preferred embodiment of a rotary-wing aircraft comprises a fuselage, a tail boom fixedly coupled the fuselage, a pylon fixedly coupled to the tail boom, and a main rotor assembly rotatably coupled to the fuselage and comprising a hub and a plurality of rotor blades pivotally coupled to the hub. The preferred embodiment also comprises a cyclic control adapted to vary an orientation of the rotor blades in relation to the hub on a cyclical basis, and a horizontal stabilizer mounted on one of the pylon and the tail boom. At least a portion of the horizontal stabilizer is movable in relation to the one of the pylon and the tail boom and a position of the at least a portion of the horizontal stabilizer is controllable independent of the cyclic control.

Another preferred embodiment of a rotary-wing aircraft comprises a fuselage, a tail boom fixedly coupled to the fuselage, a pylon fixedly coupled to the tail boom, a main rotor assembly rotatably coupled to the fuselage and comprising a plurality of rotor blades, and a horizontal stabilizer mounted on one of the pylon and the tail boom. At least a portion of the horizontal stabilizer is movable in relation to the one of the pylon and the tail boom. The preferred embodiment also comprises an inclinometer mounted on the fuselage, and an actuator system adapted to vary a position of the least a portion of the horizontal stabilizer in relation to the one of the pylon and the tail boom.

Another preferred embodiment of a rotary-wing aircraft comprises a fuselage, a tail boom fixedly coupled the fuselage, a pylon fixedly coupled to the tail boom, a main rotor assembly rotatably coupled to the fuselage and comprising a hub and a plurality of rotor blades coupled to the hub, a cyclic control adapted to change an orientation of the rotor blades in relation to the hub on a cyclical basis in response to a control input, and a horizontal stabilizer mounted on one of the pylon and the tail boom. At least a portion of the horizontal stabilizer is movable in relation to the one of the pylon and tail boom. The preferred embodiment also comprises an attitude sensor mounted on the fuselage and adapted to generate an output representing an orientation of the fuselage in relation to a direction coinciding substantially a direction of level flight of the helicopter, and a sensor adapted to measure at least a portion of the control input to the cyclic control.

Another preferred embodiment of a rotary-wing aircraft comprises a fuselage, a tail boom fixedly coupled the fuselage, and a pylon fixedly coupled to the tail boom. The preferred embodiment also comprises a main rotor assembly comprising a hub, a plurality of rotor blades pivotally coupled to the hub, a drive shaft fixedly coupled to the hub and rotatably coupled to the fuselage, a first plurality of control tubes each fixedly coupled to one of the plurality of rotor blades, a first swash plate fixedly coupled to the mast and pivotally coupled to the first plurality of control tubes, a bearing, a second swash plate rotatably coupled to the first swash plate by way of the bearing, and a second plurality of control tubes pivotally coupled the second swash plate.

The preferred embodiment also comprises a cyclic control comprising a control stick and a linkage coupled to the control stick and the second plurality of control tubes. The linkage is adapted to vary a position of the second plurality of control tubes in response to movement of the control stick so that the first and second swash plate tilt and thereby vary a position of each of the first plurality of control tubes on a cyclical basis so that an orientation of each of the plurality of rotor blades varies on a cyclical basis.

The preferred embodiment further comprises a horizontal stabilizer coupled to the tail boom. At least a portion of the horizontal stabilizer is movable in relation to the one of the pylon and the tail boom independent of the cyclic control. The preferred embodiment also comprises an attitude sensor mounted on the fuselage and adapted to generate an output representing an orientation of the fuselage in relation to a direction substantially coinciding with a direction of level flight of the helicopter.

A preferred embodiment of a system comprises a horizontal stabilizer adapted to be mounted on one of a pylon and a tail boom of a helicopter. At least a portion of the horizontal stabilizer is movable in relation to the one of a pylon and a tail boom independent of a cyclic control of the helicopter. The preferred embodiment also comprises a sensor adapted to measure at least a portion of a control input to the cyclic control, an attitude sensor mounted on a fuselage of the helicopter and adapted to generate an output representing an orientation of the fuselage in relation to a direction substantially coinciding with a direction of level flight of the helicopter, and a cockpit display adapted to display the at least a portion of a control input to the cyclic control and the orientation of the fuselage in relation to a direction substantially coinciding with a direction of level flight of the helicopter.

A preferred method of operating a helicopter comprises controlling a direction of flight of the helicopter by varying a deflection of rotor blades of the helicopter on a cyclical basis using a cyclical control of the helicopter, and adjusting an angle between a longitudinal axis of a fuselage of the helicopter and a direction coinciding substantially with a direction of level flight of the helicopter by varying a position of at least a portion of a horizontal stabilizer mounted on one of a pylon and a tail boom of the helicopter independent of the cyclic control.

Another preferred method of operating a helicopter comprises controlling a pitch angle of the helicopter using a cyclic control of the helicopter, and trimming the helicopter about a pitch axis of the helicopter by varying a position of at least a portion of a horizontal stabilizer mounted on one of a pylon and a tail boom of the helicopter independent of the cyclic control.

BRIEF DESCRIPTION OF THE DRAWINGS

The foregoing summary, as well as the following detailed description of a preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings.

DESCRIPTION OF PRESENTLY-PREFERRED EMBODIMENTS

FIGS. 1 to 5 depict a preferred embodiment of a helicopter 10 and a preferred embodiment of a system 12 for trimming the helicopter 10 about its pitch axis. Specific details relating to the helicopter 10 are presented for exemplary purposes only, as the system 12 can be used in conjunction with virtually any type of rotary-wing aircraft.

Figure 1:
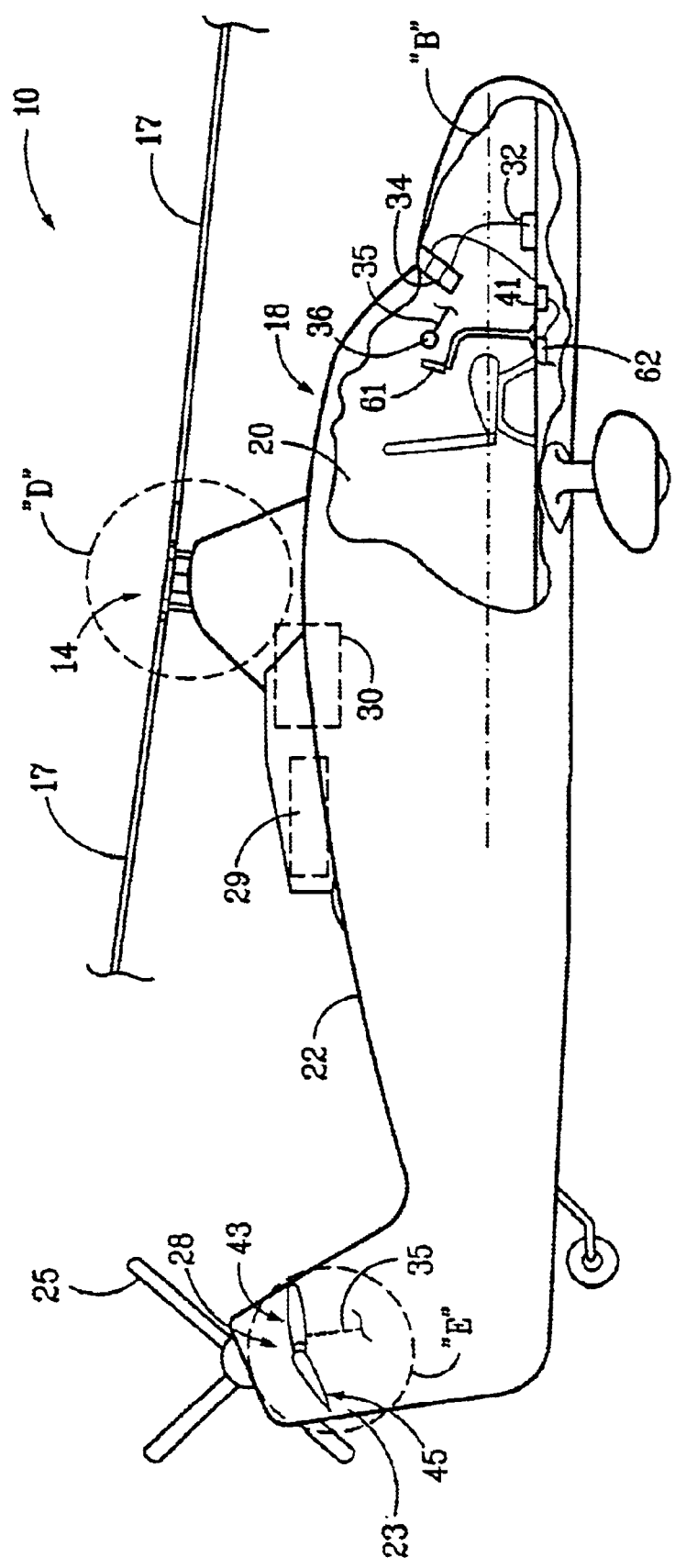
FIG. 1 is a partial cutaway, diagrammatic side view of a preferred embodiment of a helicopter, showing a movable portion of a horizontal stabilizer in a downwardly-deflected position.
Figure 2:
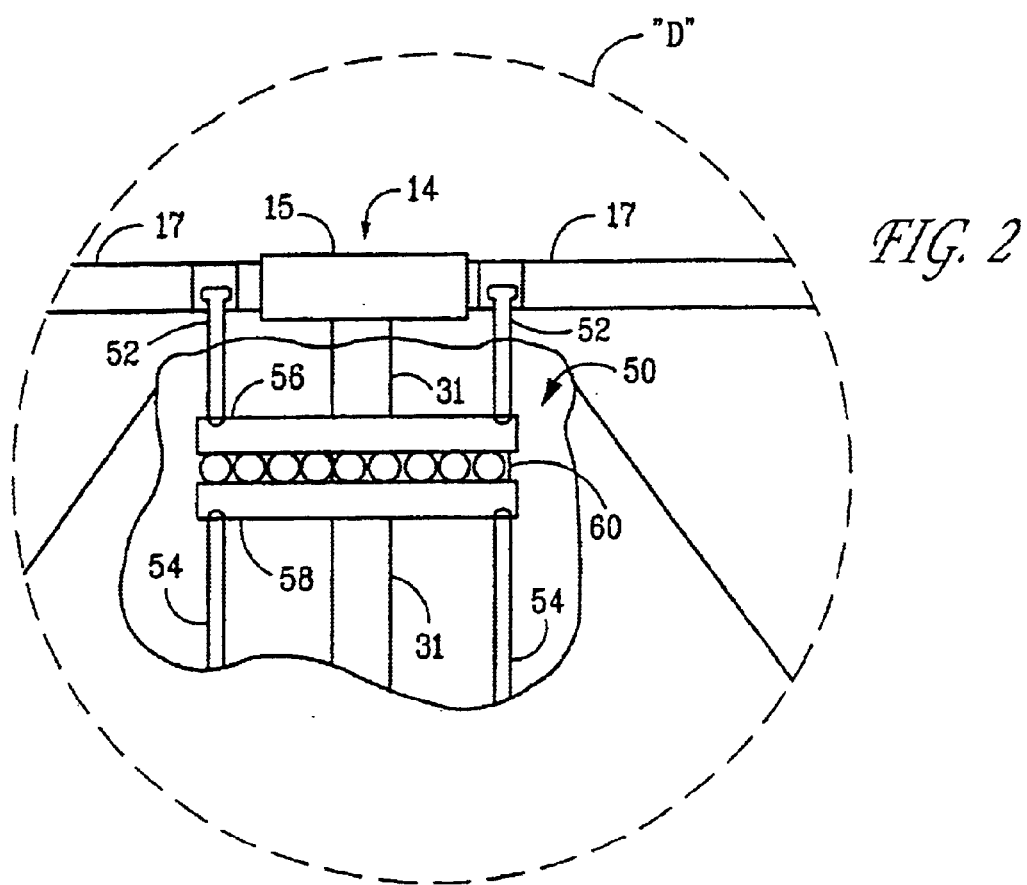
FIG. 2 is a partial cutaway, magnified side view of the designated "D" in FIG. 1.

The helicopter 10 comprises a main rotor assembly 14 of conventional design (see FIGS. 1 and 2). The main rotor assembly 14 rotates in a counter-clockwise direction as viewed from above, about an axis passing through its center. The main rotor assembly 14 comprises a hub 15, and a plurality of rotor blades 17 pivotally coupled to the hub 15. The main rotor assembly 14 further comprises a mast, or drive shaft 31, fixedly coupled to the hub 15.

The helicopter 10 also comprises a fuselage 18, and an empennage, or tail boom 22, fixedly coupled to and extending rearward from the fuselage 18. The fuselage 18 includes a cabin 20 that accommodates a pilot, passengers, and cargo. The helicopter 10 further comprises a pylon 23 fixedly coupled to a rearward end of the tail boom 22.

The helicopter 10 also comprises a first and a second engine 29, and a transmission 29. The first and second engine 29 and the transmission 33 are mounted on the fuselage 18. The drive shaft 31 is coupled to the transmission 33 so that torque generated by the engines 29 imparts rotation to the drive shaft 31 (and the rotor blades 17). Rotation of the rotor blades 17 generates lift that suspends the fuselage 18 below the main rotor assembly 14 during flight.

The lift generated by each rotor blade 17 is related to the orientation of the rotor blade 17 in relation to its direction of travel. More particularly, increasing the pitch of each rotor blade 17 in relation to its direction of travel increases the angle of attack of the rotor blade 17, and thereby increases the lift generated by the rotor blade 17.

The main rotor assembly 14 further comprises a swash plate assembly 50, a plurality of rotating control tubes 52, and a plurality of non-rotating control tubes 54 (see FIG. 2). The swash plate assembly 50 comprises a rotating swash plate 56 and a non-rotating swash plate 58 each positioned around the drive shaft 31. The swash plate assembly 50 also comprises a plurality of bearings 60 positioned between the rotating swash plate 56 and the non-rotating swash plate 58. The rotating swash plate 56 is fixedly coupled to the drive shaft 31, and thus rotates with the drive shaft 31.

The rotating control tubes 52 are coupled to the rotating swash plate 56 so that vertical movement of all or a portion of the rotating swash plate 56 induces a corresponding vertical movement one or more of the rotating control tubes 52. Each rotating control tube 52 is also coupled to a respective one of the rotor blades 17 so that vertical movement of the rotating control tube 52 causes the corresponding rotor blade 17 to pivot in relation to the hub 15, thereby altering the angle of attack of the rotor blade 17.

It should be noted that directional terms such as "vertical," "upward," "downward," etc." are used in reference to the component orientations depicted in FIG. 1. These terms are used for illustrative purposes only, and are not intended to limit the scope of the appended claims.

The non-rotating control tubes 54 are coupled to the non-rotating swash plate 58 so that vertical movement of one or more of the non-rotating control tubes 54 induces a corresponding vertical movement in all or a portion of the non-rotating swash plate 58.

The helicopter 10 also comprises a conventional collective control to control the lift generated by the main rotor assembly 14. Specific details relating to the collective control are not necessary to an understating of the invention and, therefore, are not presented herein.

The helicopter 10 further comprises a conventional cyclic control that, in conjunction with a conventional tail rotor 25, provides directional control for the helicopter 10. The cyclic control comprises a control stick 61 mounted in the cabin 20 proximate the pilot's position, and a mechanical linkage 62 coupled to the control stick 61 and the non-rotating control tubes 54 (see FIGS. 1 and 5). Movement of the control stick 61 from its neutral (centered) position in response to pilot input imparts movement to the linkage 62. This movement is transmitted to the non-rotating control tubes 54 via the linkage 62, and causes the non-rotating control tubes 54 to move upward or downward in a non-uniform manner in relation to the hub 15.

The non-uniform vertical movement of the non-rotating control tubes causes the non-rotating swash plate 58 to tilt in relation to the fuselage 18 and the hub 15. The non-rotating swash plate 58 imparts a corresponding tilt to the rotating swash plate 56 by way of the bearings 60.

The tilt of the rotating swash plate 56 causes the rotating control tubes 52 to move upward and downward on a cyclical basis as the rotating swash plate 56 and the rotating control tubes 52 rotate in relation to the non-rotating swash plate 54. The cyclical vertical movement of each rotating control tube 52 causes the rotor blade 17 coupled thereto to deflect in relation to the hub 15 on a cyclical basis. In other words, the upward and downward movement of the rotating control tubes causes the angle of attack of each rotor blade 17 to vary throughout each revolution of the rotor blade 17. This cyclical variation causes the main rotor assembly 14 to generate asymmetric lift. The asymmetric lift causes the helicopter to pitch or roll, and thereby provides directional control for the helicopter 10.

The tail rotor 25 is rotatably coupled to the pylon 23 (see FIG. 1). The tail rotor 25 is driven by the transmission 29 via a first shaft extending between the transmission 29 and an intermediate gearbox (not pictured) located within the tail boom 22, and a second shaft extending between the intermediate gearbox and the tail rotor 25. The tail rotor 25 generates a torque about the yaw axis of the helicopter 10. This torque counteracts the torque of main rotor assembly 14, and provides directional control for the helicopter 10. Further details relating to the structure and operation of the tail rotor 25 are not necessary for an understating of the invention, and therefore are not presented herein.

The system 12 comprises a horizontal stabilizer 28, an actuator system 30 for moving a portion of the horizontal stabilizer 28, and an attitude sensor for measuring the tilt angle of the fuselage 18. The system 12 also comprises a cockpit display 34 for displaying the position of the horizontal stabilizer 28, the tilt angle of the fuselage 18, and the position of the control stick 61.

Details relating to the horizontal stabilizer 28 are as follows. The horizontal stabilizer 28 is used to stabilize and trim the helicopter 10 about its pitch axis. The horizontal stabilizer 28 is mounted on the pylon 23. More particularly, the horizontal stabilizer 28 is mounted on an opposite side of the pylon 23 from the tail rotor 25 (see FIG. 1). It should be noted that the horizontal stabilizer 28 is depicted in a particular location for exemplary purposes only; the horizontal stabilizer 28 can be mounted at other locations on the pylon 23 in alternative embodiments. Moreover, the horizontal stabilizer 28 can be mounted on the tail boom 22 in alternative embodiments.

Figure 3:
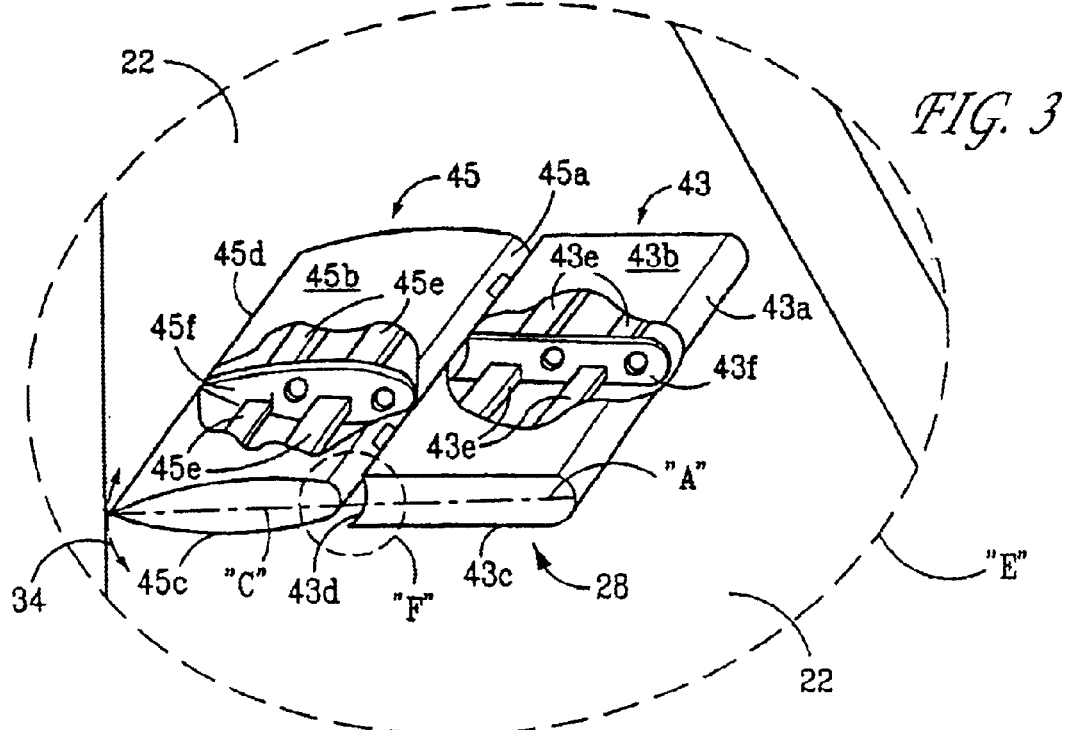
FIG. 3 is a partial cutaway, magnified perspective view of the area designated "E" in FIG. 1, depicting the movable portion of the horizontal stabilizer in a neutral position.
Figure 4:
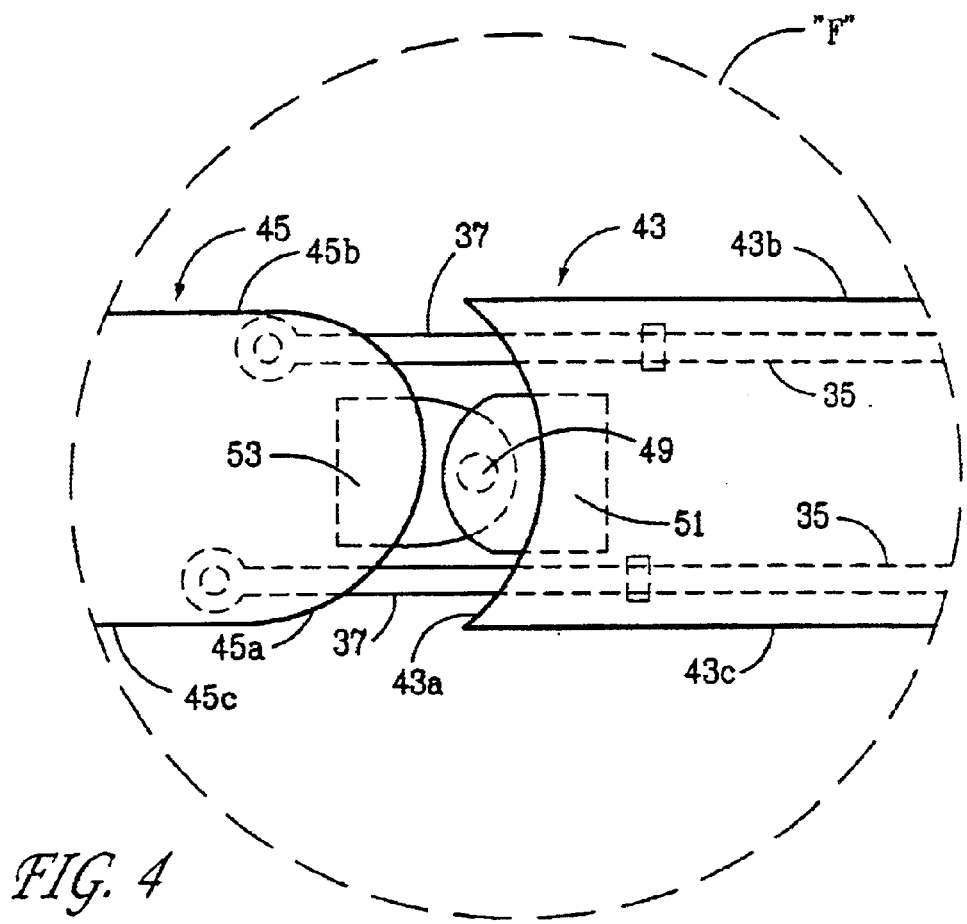
FIG. 4 is a magnified side view of the area designated "F" in FIG. 3.

The horizontal stabilizer 28 has a fixed portion 43 fixedly coupled to the pylon 23, and a movable portion 45 movably coupled to the fixed portion 43 (see FIGS. 1, 3, and 4). The fixed portion 43 has a substantially rounded leading edge panel 43a, a substantially planar upper panel 43b, and a substantially planar lower panel 43c. The upper panel 43b and the lower panel 43c each adjoin the leading edge panel 43a. The fixed portion 43 also includes a trailing edge panel 43d that adjoins each of the upper panel 43b and the lower panel 43c. The trailing edge panel 43d has a substantially concave shape, as depicted in FIGS. 3 and 4. It should be noted that the optimal external configuration for the fixed portion 43 will vary by application, and a particular external configuration is described herein for exemplary purposes only.

The fixed portion 43 has a conventional internal structure comprising a plurality of spars 43e extending between the inboard and outboard edges of the fixed portion 43, and a plurality of frames 43f secured to the spars 43e and extending substantially perpendicular thereto (see FIG. 3). The leading edge panel 43a, upper panel 43b, lower panel 43c, and trailing edge panel 43d are fixed to the frames 43f using conventional rivets. It should be noted that a particular type of internal structure for the fixed portion 43 is described herein for exemplary purposes only. The fixed portion 43 can be constructed with virtually any type of internal structure adapted to withstand the mechanical and aerodynamic loads to which the fixed portion 43 is subjected during flight, e.g., aluminum.

The movable portion 45 includes a substantially rounded leading edge panel 45*a*, a substantially planar upper panel 45*b*, and a substantially planar lower panel 45*c*. The upper panel 45*b* and the lower panel 45*c* each adjoin the leading edge panel 45*a*. Moreover, the upper panel 45*b* and the lower panel 45*c* adjoin each other at a trailing edge 45*d* of the movable portion 45. It should be noted that the optimal external configuration for the movable portion 45 will vary by application, and a particular external configuration is described herein for exemplary purposes only.

The movable portion 45 has a conventional internal structure comprising a plurality of spars 45*e* extending between the inboard and outboard edges of the movable portion 45, and a plurality of frames 45*f* secured to the spars 45*e* and extending substantially perpendicular thereto (see FIG. 3). The leading edge panel 45*a*, upper panel 45*b*, and lower panel 45*c* are fixed to the frames 45*f* using conventional rivets. It should be noted that a particular type of internal structure for the movable portion 45 is described herein for exemplary purposes only. The movable portion 45 can be constructed with virtually any type of internal structure adapted to withstand the mechanical and aerodynamic loads to which the movable portion 45 is subjected during flight.

The various components of the fixed portion 43 and the movable portion 45 are preferably formed from a lightweight material having sufficient strength to withstand the mechanical and aerodynamic loads to which the fixed portion 43 is subjected during flight, e.g., aluminum.

The movable portion 45 is coupled to the fixed portion 43 using pins 49 that securely engage hinges 51 and hinges 53 on the respective fixed portion 43 and movable portion 45 (see FIG. 4). This arrangement permits the movable portion 45 to pivot in relation to the fixed portion 45. More particularly, the trailing edge 45*d* of the movable portion 45 is adapted to deflect along an arc denoted by the arrow 34 in FIG. 3. The maximum amount of deflection in the trailing edge 45*d* will vary by application; thus, a specific number for this parameter is not specified herein. The movable portion 45 has a neutral position in which the trailing edge 45*d* is substantially coincident with a projection of the centerline of the fixed portion 43. (The centerline of the fixed portion 43 is denoted by the line "A" in FIG. 3). The effect of varying the position of the movable portion 45 is discussed below.

Figure 5:
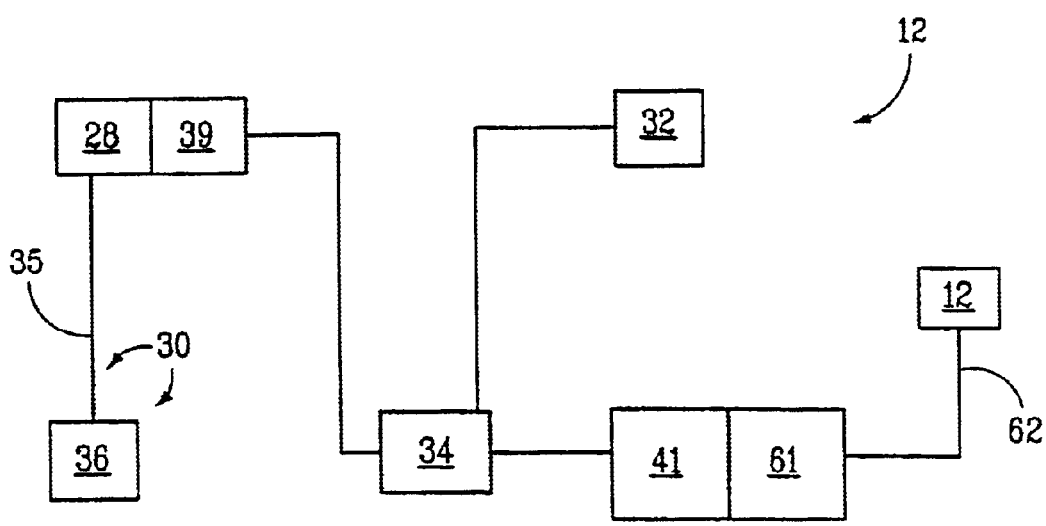
FIG. 5 is a block diagram depicting a system for trimming the helicopter shown in FIGS. 1–4 about a pitch axis of the helicopter.

The actuator system 30 comprises a conventional mechanical linkage 35 and a hand-actuated dial, or trim wheel 36, mounted in the cockpit proximate the pilot (see FIGS. 1, 4, and 5). The mechanical linkage 35 comprises conventional wire cable and pulleys adapted to transmit a control input to an aerodynamic surface, as is commonly known to those skilled in the art of aircraft design. (The size of the various components of the linkage 35 and the control wheel 36 are exaggerated in FIGS. 1 and 4, for clarity.)

The actuator system 30 varies the position of the movable portion 45 of the horizontal stabilizer 28 in response to pilot input. More particularly, rotation of the control wheel 36 by the pilot imparts a tension to the linkage 35, and induces a corresponding movement in the linkage 35. This movement is transmitted to trunnions 37 pivotally coupled to the movable portion 45 (see FIG. 4). Movement of the trunnions 37 causes the movable portion 45 to pivot upwardly or downwardly.

It should be noted that the actuator system 30 is described in detail for exemplary purposes only. Other types of actuators, such as electrical or hydraulic actuators, can be used in lieu of the actuator system 30. Moreover, other suitable types of knobs or switches, etc., can be used in lieu of the control wheel 36.

The system 12 includes a position sensor 39 adapted to measure the deflection of the horizontal stabilizer 28 from its neutral position (see FIG. 4). The output of the position sensor 39 is transmitted to the cockpit display 34, where it is processed and displayed in analog form. The displayed value represents the angular position of the horizontal stabilizer 28, in degrees, in relation to its neutral position. (The output of the position sensor 39 may be displayed as a digital readout in alternative embodiments.) The position sensor 39 may be, for example, a linearly-variable resistor.

The attitude sensor of the system 12 is preferably an inclinometer 32 (also known as a "tilt sensor" or "tilt transducer") (see FIGS. 1 and 5). The inclinometer 32 is adapted to measure inclination, or tilt angle, using gravity as a reference. In other words, the inclinometer 32 measures the deviation of a reference axis from the direction of gravity.

The inclinometer 32 is mounted on the fuselage 18 so that its reference axis is substantially parallel to the longitudinal centerline of the fuselage 18. (The longitudinal centerline of the fuselage 18 is denoted by the line "B" in FIG. 1.) For example, the inclinometer 32 may be mounted on a substantially flat portion of the floor of the fuselage 18.

The inclinometer 32 thus measures the angular deviation of the longitudinal centerline of the fuselage 18 from the direction of gravity. The inclinometer 32 is programmed to generate an output corresponding to the complement of the angular deviation. This quantity represents the tilt angle of the fuselage 18 with respect to a direction corresponding to level flight of the helicopter 10. In other words, the output of the inclinometer 32 represents the angle between the longitudinal centerline of the fuselage 18 and the direction of level flight.

The inclinometer 32 is preferably an electronic inclinometer, although a mechanical inclinometer can be used in the alternative. Moreover, other types of attitude sensors may be used in lieu of the inclinometer 32. A suitable electronic inclinometer can be obtained, for example, from Applied Geomechanics Inc. of Santo Cruz, Calif., as model number 900, 900-T, 900-45, or 900-45T.

The output of the inclinometer 32 is transmitted to the cockpit display 34, where it is processed and displayed in analog form. The displayed value represents the tilt angle of the fuselage 18, in degrees. (The output of the inclinometer 32 may be displayed as a digital readout in alternative embodiments.)

The system 12 further comprises a sensor 41 adapted to measure the position of the control stick 61 (see FIGS. 1 and 5). More particularly, the sensor 41 measures the forward or aft deflection of the control stick 61 from its neutral position. In other words, the sensor 41 indicates the amount of pitch control being demanded by the pilot at a particular time. The sensor 41 may comprise, for example, a 20K-ohm potentiometer and a 5-volt power supply electrically coupled to the potentiometer.

The output of the sensor 41 is transmitted to the cockpit display 34, where it is processed and displayed in analog form. The displayed value represents the forward or rearward deviation of the cyclic stick from its neutral position, in degrees. The position sensor 39 may be, for example, a linearly-variable resistor. (The output of the sensor 41 may be displayed as a digital readout in alternative embodiments.)

Operational details relating to the system 12 are as follows. The horizontal stabilizer 28 is adapted to generate an aerodynamic force that acts in a direction substantially perpendicular to the direction of flight of the helicopter 10. For simplicity, this force is hereinafter referred to as the "lift" of the horizontal stabilizer 28.

The lift of the horizontal stabilizer 28 produces a torque, or moment, about the pitch axis of the helicopter 10. This torque can be used to trim the helicopter 10 about its pitch axis, as explained below. (It should be noted that the aerodynamic forces generated by the horizontal stabilizer 28 are also believed to stabilize the helicopter 10 about its pitch axis.)

The lift of the horizontal stabilizer 28 is believed to be related to the velocity of the airflow passing over the horizontal stabilizer 28. The airflow passing over the horizontal stabilizer 28 is apparently generated primarily by the tail rotor 25, and by the forward velocity of the helicopter 10.

The lift of the horizontal stabilizer 28 can be varied by changing the angular position of the movable portion 45 in relation to the pylon 23. More particularly, changing the angular position of the movable portion 45 alters the angle between the chord line of the movable portion 43 and the airflow, or relative wind, passing over the pylon 23 by virtue of the forward motion of the helicopter 10. (The chord line of the movable portion 45 is denoted by the line "C" in FIG. 3. The angle between the cord line and the relative wind is hereinafter referred to as the "angle of attack" of the movable portion 45).

Rotating the movable portion 45 from its neutral position so that the trailing edge 45*d* deflects downward produces a positive angle of attack in the movable portion 45, and imparts a downward deflection to the airflow passing over the horizontal stabilizer 28 (from the perspective of FIG. 1). The horizontal stabilizer 28 thus develops positive lift, i.e., lift in the upward direction, when configured in this manner.

Rotating the horizontal stabilizer 28 from its neutral position so that the trailing edge 45*d* deflects downward produces a negative angle of attack in the movable portion 45, and imparts an upward deflection to the airflow passing over the horizontal stabilizer 28. The horizontal stabilizer 28 thus develops negative lift, i.e., lift in the downward direction, when configured in this manner.

The amount of lift developed by the horizontal stabilizer 28 in the upward or downward directions is believed to be proportional to the deflection of the movable portion 45 from its neutral position. The helicopter 10 can thus be trimmed about its pitch axis by varying the position of the movable portion 45 to alter the lift (and the resulting torque) generated by the horizontal stabilizer 28.

The selectively-variable torque produced by the horizontal stabilizer 28 can, under certain conditions, reduce or eliminate the need for cyclic control to trim the helicopter 10 about its pitch axis. The cyclic control can thus operate closer to its neutral (most efficient) position than may otherwise be possible. In other words, the horizontal stabilizer 28 can be used as the primary source of pitch-axis trim for the helicopter 10, and can perform this function substantially independent of the cyclic control under certain conditions. Reducing or eliminating the amount of cyclic control needed to maintain a given operating condition is believed to decrease the required amount of amount of power, and thus, the fuel consumption, at that operating condition. This feature is to be particularly advantageous where the center of gravity of the helicopter 10 is at or near its forward or aft limits, i.e., where the greatest amount of cyclic control is usually needed to trim a helicopter about its pitch axis.

Moreover, the system 12 can be used to control the orientation of the fuselage 18 and thereby reduce the fuel consumption or increase the airspeed of the helicopter 10. More particularly, the horizontal stabilizer 28 can apparently generate a torque about the pitch axis of the helicopter 10 substantially independent of the cyclic control. Hence, the cyclic control can be used primarily to control the tilt angle of the rotor to obtain a given airspeed, while the tilt angle of the fuselage can be controlled primarily using the horizontal stabilizer 28. The tilt angle of the fuselage can therefore be set at an optimum value, e.g., zero degrees, using the system 12, while the airspeed is set at a desired value using the cyclic control.

In practice, the tilt angle of the fuselage 18 is measured by the inclinometer 32 and displayed to the pilot on the cockpit display 34. The pilot can adjust the tilt angle of the fuselage to a desired value by varying the position of the horizontal stabilizer 28 (using the trim wheel 36) until the displayed tilt angle reaches the desired value.

A fuselage tilt angle of approximately zero, as noted above, is believed to minimize the aerodynamic drag on the fuselage 18, and is thus preferable. (Upward or downward deviations in the fuselage tilt angle as low as two degrees are believed to cause increases in drag as high as approximately twenty percent.) The system 12, and the operating technique described herein, have the potential to substantially reduce the tilt angle under certain conditions, including conditions at which the center of gravity of the helicopter 10 its at or near its forward or aft limits. Moreover, the pilot can monitor the fuselage tilt angle throughout a particular flight, and can periodically adjust the position of the horizontal stabilizer to maintain a desired tilt angle as operating conditions change during flight, e.g., as the center of gravity of the helicopter 10 shifts due to fuel burn.

Thus, a substantial reduction in drag, and the reduced fuel consumption and increased airspeed that usually accompany reductions in drag, are believed to be possible though the use of the system 12 and the corresponding operating technique described herein.

Moreover, measuring and displaying the tilt angle of the fuselage 18, the position of the horizontal stabilizer 28, and the position of the control stick 61 allows the pilot to set these parameters to a predetermined set of values that, for a given operating condition, can result in minimal fuel consumption, maximal airspeed, minimal vibration, etc.

It is to be understood that even though numerous characteristics and advantages of the present invention have been set forth in the foregoing description, the disclosure is illustrative only and changes can be made in detail within the principles of the invention to the full extent indicated by the broad general meaning of the terms in which the appended claims are expressed.

For example, alternative embodiments of the horizontal stabilizer 28 can be formed as a single-piece unit that is adapted to move in its entirety. Also, the system 12 can be equipped with a microprocessor-based controller that is programmed to automatically vary the position of the horizontal stabilizer 28 to maintain, for example, an optimum fuselage tilt angle.

Moreover, numerous variations of the helicopter 10 are possible within the contemplated scope of the invention. For example, alternative embodiments of the helicopter 10 may forgo the use of the tail rotor 25, and may instead use a rotorless anti-torque system.

What is claimed is:

1. A method of operating a helicopter, comprising:

measuring an angle between a longitudinal axis of a fuselage of the helicopter and a direction coinciding substantially with a direction of level flight of the helicopter using an inclinometer fixedly coupled to the fuselage;

measuring cyclic pitch of rotor blades of the helicopter using a sensor responsive to a position of a cyclic stick of a cyclic control of the helicopter;

controlling a direction of flight of the helicopter by controlling the cyclic pitch using the cyclic control;

controlling the angle between the longitudinal axis of a fuselage of the helicopter and the direction coinciding substantially with a direction of level flight of the helicopter substantially independent of the cyclic control by varying a position of at least a portion of a horizontal stabilizer mounted on one of a pylon and a tail boom of the helicopter; and minimizing the cyclic pitch of the rotor blades and the angle between the longitudinal axis of a fuselage of the helicopter and the direction coinciding substantially with the direction of level flight based on the measurements from the inclinometer and the sensor.

2. The method of claim 1, wherein minimizing the angle between the longitudinal axis of a fuselage of the helicopter and the direction coinciding substantially with the direction of level flight comprises adjusting the angle to approximately zero.

3. The method of claim 1, wherein controlling the angle between the longitudinal axis of a fuselage of the helicopter and the direction coinciding substantially with a direction of level flight of the helicopter independent of the cyclic control by varying a position of at least a portion of a horizontal stabilizer mounted on one of a pylon and a tail boom of the helicopter comprises adjusting an orientation of the at least a portion of a horizontal stabilizer independent of the cyclic control to substantially align the longitudinal axis with the direction of level flight.

4. The method of claim 1, wherein measuring cyclic pitch of rotor blades of the helicopter using a sensor responsive to a position of a cyclic stick of a cyclic control of the helicopter comprises measuring at least one of a forward and an aft deflection of the control stick from a neutral position of the control stick.

5. The method of claim 1, wherein measuring cyclic pitch of rotor blades of the helicopter using a sensor responsive to a position of a cyclic stick of a cyclic control of the helicopter comprises measuring the cyclic pitch of the rotor blades using a potentiometer.

* * * * *